United States Patent
Yuan et al.

(10) Patent No.: US 8,248,896 B1
(45) Date of Patent: Aug. 21, 2012

(54) METHOD AND SYSTEM FOR PROVIDING AN ENERGY ASSISTED MAGNETIC RECORDING DISK DRIVE HAVING IMPROVED HEAT DISSIPATION

(75) Inventors: Hongxing Yuan, San Ramon, CA (US); Ge Yi, San Ramon, CA (US); Shing Lee, Fremont, CA (US); Wentao Yan, Fremont, CA (US); Zhongyan Wang, San Ramon, CA (US); Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 246 days.

(21) Appl. No.: 12/822,330

(22) Filed: Jun. 24, 2010

(51) Int. Cl.
*G11B 11/00* (2006.01)

(52) U.S. Cl. ................ 369/13.33; 369/112.27

(58) Field of Classification Search ........... 369/13.33, 369/13.32, 13.24, 13.14, 13.03, 13.02, 13.12, 369/112.27, 112.09, 112.01; 360/59, 313, 360/125.31, 125.74
See application file for complete search history.

(56) References Cited

U.S. PATENT DOCUMENTS

| | | | |
|---|---|---|---|
| 6,381,094 B1 | 4/2002 | Gill | |
| 6,760,191 B1 | 7/2004 | Yan et al. | |
| 7,027,700 B2 | 4/2006 | Challener | |
| 7,149,055 B2 | 12/2006 | Clinton et al. | |
| 7,170,713 B2 | 1/2007 | Gider et al. | |
| 7,193,817 B2 | 3/2007 | Lille | |
| 7,212,367 B2 | 5/2007 | Clinton et al. | |
| 7,238,292 B1 | 7/2007 | He et al. | |
| 7,379,269 B1 | 5/2008 | Krounbi et al. | |
| 7,391,590 B2 | 6/2008 | Matono et al. | |
| 7,505,227 B2 | 3/2009 | Lee et al. | |
| 7,522,379 B1 | 4/2009 | Krounbi et al. | |
| 7,612,965 B2 | 11/2009 | Kurihara et al. | |
| 7,961,417 B2 * | 6/2011 | Seigler et al. | 360/59 |
| 8,031,561 B2 * | 10/2011 | Hellwig et al. | 369/13.01 |
| 8,116,171 B1 * | 2/2012 | Lee | 369/13.01 |
| 2002/0154451 A1 | 10/2002 | Dimitrov et al. | |
| 2003/0067717 A1 | 4/2003 | Garfunkel et al. | |
| 2005/0094319 A1 | 5/2005 | Han et al. | |
| 2006/0098337 A1 | 5/2006 | Guthrie et al. | |
| 2008/0068748 A1 | 3/2008 | Olson et al. | |

* cited by examiner

*Primary Examiner* — Ali Neyzari (57) ABSTRACT

An energy assisted magnetic recording (EAMR) transducer coupled with a laser is described. The EAMR transducer has an air-bearing surface (ABS) residing near a media during use. The laser provides energy. The transducer includes a waveguide, a near field transducer (NFT) proximate to the ABS, a write pole and at least one coil. The waveguide directs the energy from the laser toward the ABS. The NFT is optically coupled with the waveguide and focuses the energy onto a region of the media. The write pole writes to the region of the media. The write pole has a magnetic portion and a nonmagnetic liner. The magnetic portion has a plurality of sides and a pole thermal conductivity. The nonmagnetic liner is adjacent to at least the sides of the magnetic portion, and has a liner thermal conductivity greater than the pole thermal conductivity. The coil(s) are for energizing the write pole.

24 Claims, 5 Drawing Sheets

METHOD AND SYSTEM FOR PROVIDING AN ENERGY ASSISTED MAGNETIC RECORDING DISK DRIVE HAVING IMPROVED HEAT DISSIPATION

BACKGROUND

Figure 1:
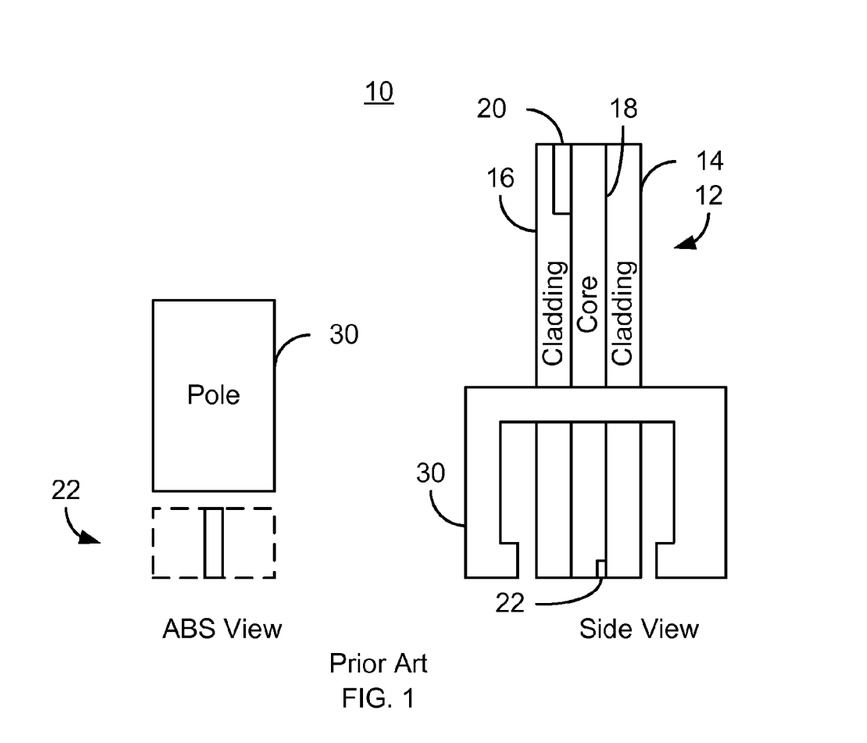
FIG. 1 depicts a side view of a conventional EAMR transducer.

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, and a conventional pole 30. Light from a laser (not shown) is incident on the grating 20, which coupled light to the waveguide 12. Light is guided by the conventional waveguide 12 to the NFT 22 near the air-bearing surface (ABS). The NFT 22 focuses the light to magnetic recording media (not shown), such as a disk.

In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. The trend in magnetic recording continues to higher recording densities. For example, currently, magnetic recording densities reaching 500-600 Gb/in$^2$ are desired. At such high densities, performance of the conventional NFT 22 may degrade. In some instances, the conventional NFT 22 may be destroyed during use.

Accordingly, what is needed is a system and method for improving performance and reliability of an EAMR transducer.

BRIEF SUMMARY OF THE INVENTION

An energy assisted magnetic recording (EAMR) transducer coupled with a laser is described. The EAMR transducer has an air-bearing surface (ABS) residing near a media during use. The laser provides energy. The transducer includes a waveguide, a near field transducer (NFT) proximate to the ABS, a write pole and at least one coil. The waveguide is configured to direct the energy from the laser toward the ABS. The NFT is optically coupled with the waveguide and focuses the energy onto a region of the media. The write pole writes to the region of the media. The write pole has a magnetic portion and a nonmagnetic liner. The magnetic portion has a plurality of sides and a pole thermal conductivity. The nonmagnetic liner is adjacent to at least the sides of the magnetic portion and has a liner thermal conductivity greater than the pole thermal conductivity. The coil(s) are for energizing the write pole.

DETAILED DESCRIPTION OF THE PREFERRED EMBODIMENTS

Figure 2:
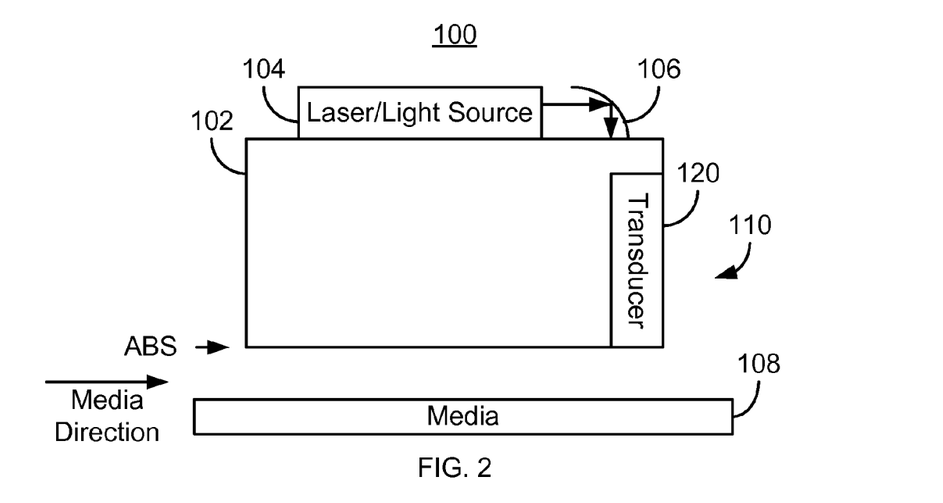
FIG. 2 depicts an exemplary embodiment of a portion of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes a slider 102, a laser/light source 104, a mirror or other optics 106 for redirecting light from the laser 104, media 108, and an EAMR head 110. In some embodiments, the laser 104 is a laser diode. Although shown as mounted on the slider 102, the laser 104 may be coupled with the slider 102 in another fashion. For example, the laser 104 might be mounted on a suspension (not shown in FIG. 2) to which the slider 102 is also attached. The media 108 may include multiple layers, which are not shown in FIG. 2 for simplicity.

The EAMR head 110 includes an EAMR transducer 120. The EAMR head 110 may also include a read transducer (not shown in FIG. 2). The read transducer may be included if the EAMR head 110 is a merged head. The EAMR transducer 120 includes optical components (not shown in FIG. 2) as well as magnetic components (not shown in FIG. 2).

Figure 3:
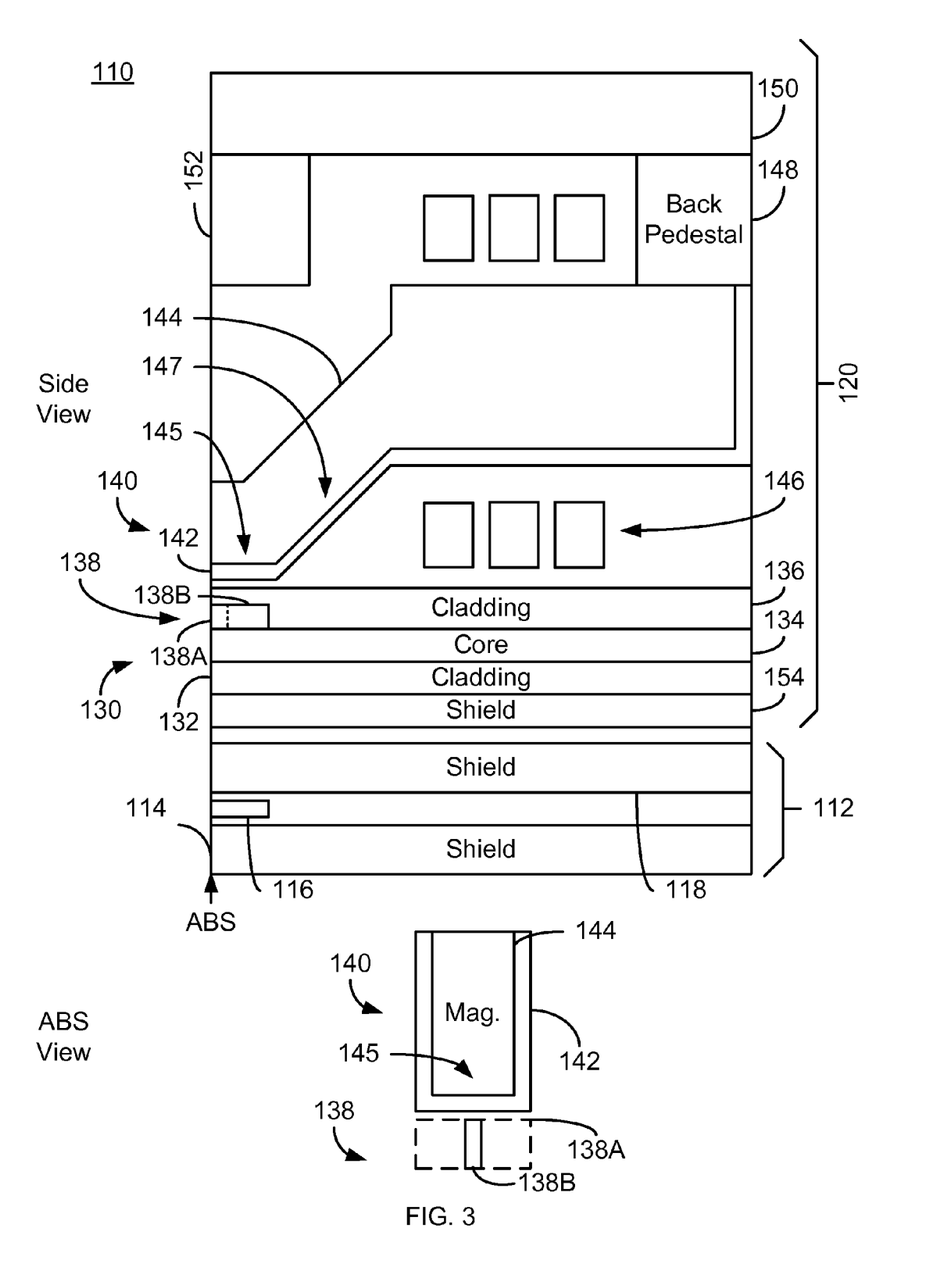
FIG. 3 depicts ABS and side views of an exemplary embodiment of a portion of an EAMR head.

FIG. 3 depicts a side view of an exemplary embodiment of a portion of the EAMR head 110. For clarity, FIG. 3 is not to scale. Referring to FIGS. 2-3, for simplicity not all portions of the EAMR head 110 are shown. In addition, although the EAMR head 110 is depicted in the context of particular components other and/or different components may be used. Further, the arrangement of components may vary in different embodiments. The EAMR head 110 may be used in the EAMR disk drive 100. Consequently, similar components have analogous labels. The EAMR head 110 includes a reader transducer 112 and an EAMR transducer 120.

The read transducer 112 includes shields 114 and 118 and reader sensor 116. In some embodiment, the read sensor 116 may be a giant magnetoresistance sensor, such as a spin tunneling junction. However, in other embodiments, another sensor may be used.

The EAMR transducer 120 includes waveguide 130, NFT 138, write pole 140, back pedestal 148, return pole 150, optional stitch 152 and shield 154. The EAMR transducer 120 may also include a grating (not shown) that is used to couple light from the laser 104 to the waveguide 130. The coil(s) 146 may be pancake or, as is shown in FIG. 3, solenoidal. The coil(s) 146 may be used to energize the write pole 140 during writing.

The waveguide 130 directs energy from the laser 104 to the ABS. The waveguide 130 includes cladding 132 and 136 as well as core 134. The NFT 138 is optically coupled with the waveguide 130, receiving energy from the core 134. The NFT 138 is proximate to the ABS. For example, the NFT 138 is shown as having a surface occupying a portion of the ABS. The NFT 138 is optically coupled with the waveguide 130 and focuses energy from the waveguide onto a region of the media 108. In some embodiments, the NFT 138 includes a disk 138A and a pin 138B. The pin 138B is between the disk 138A and the ABS. Thus, the disk 138A is recessed from the ABS and thus is shown by a dashed line in the ABS view of FIG. 3. The disk 138A extends further in the track width direction (perpendicular to the plane of the page in FIG. 3) than the pin 138B. Although termed a disk, the disk 138A of the NFT 138 need not be disk-shaped. For example, instead of having a circular footprint, the disk 138A may be square, rectangular, or have another shape.

The write pole 140 is configured to write to the region of the media heated by the NFT 138. In some embodiments, the write pole 140 does not extend more than across the disk 138A of the NFT in the track width direction. Thus, for example, the width of the write pole 140 in the track width direction may be less than two hundred nanometers. The main pole 140 includes a magnetic portion 144 and a nonmagnetic liner 142. The magnetic portion 144 includes NFT-facing surface 145 and bottom surface 147. The NFT-facing surface faces NFT 138 and may be substantially parallel to the top surface of the NFT 138. The bottom surface 147 slopes away from the NFT. Although shown as extending past the NFT 138, the NFT-facing surface 145 may not extend as far from the ABS as the NFT 138. In some embodiments, the NFT-facing surface 147 may be omitted or extend a negligible distance from the ABS. A pole that omits the NFT-facing surface may be termed a zero throat height pole as the back surface 147 extends substantially to the ABS. In such an embodiment, the pole 140 may extend further than the NFT 138 in the track width direction. In other embodiments, the back surface 147 might not be sloped or be sloped in another manner. The magnetic portion 144 has a pole thermal conductivity. For example, the pole thermal conductivity may be on the order of 35 W/mK. The magnetic portion 144 may also include high saturation magnetization material(s).

The nonmagnetic liner 142 is nonmagnetic and is adjacent to at least the sides of the magnetic portion 144. In some embodiments, the nonmagnetic liner 142 adjoins the sides of the magnetic portion 144. In the embodiment shown, the nonmagnetic liner 142 also covers the bottom and back of the magnetic portion 144. However, in other embodiments, some or all of the bottom and/or back of the magnetic portion 144 may not be covered by the nonmagnetic liner. For example, in some embodiments, the nonmagnetic liner 142 may not extend all the way to the ABS. In some embodiments, the nonmagnetic liner 142 may not extend further from the ABS than the NFT 138. Thus, the nonmagnetic liner 142 might extend a smaller or equivalent distance from the ABS as the NFT 138. Further, the nonmagnetic liner 142 is shown as having substantially the same thicknesses under the magnetic portion 144 as on the back of the magnetic portion 144. However, in other embodiments, the nonmagnetic liner 142 may have different thicknesses on the back as on under the magnetic portion 144. A space is shown between the NFT 138 and the write pole 140. However, in other embodiments, the nonmagnetic liner 142 may also directly contact the NFT 138.

The nonmagnetic liner 142 also has a liner thermal conductivity. In some embodiments, the liner thermal conductivity is greater than the pole thermal conductivity of the magnetic portion 144. For example, the nonmagnetic liner 142 might include materials such as gold, copper, silver, their alloys and/or high thermal conductivity materials. As used herein, a high thermal conductivity material has a thermal conductivity greater than the pole thermal conductivity of the magnetic portion 144. For example some high thermal conductivity materials may have a thermal conductivity on the order of 80-100 W/mK or more. Some such materials may have a thermal conductivity of 150 W/mK or more. Other materials may have a thermal conductivity of 200 W/mK or more. Thus, the nonmagnetic liner 142 might be electrically conductive or electrically insulating. However, in either case, the nonmagnetic liner 142 has a higher thermal conductivity than the magnetic portion 144. For example, a high thermal conductivity composite including both insulating and conducting materials may also be used for the nonmagnetic liner 142.

The nonmagnetic liner 142 has a liner optical absorption of the energy from the laser 104. In such embodiments, the magnetic portion 144 of the write pole 140 has a magnetic portion optical absorption of the energy from the laser 104. In some embodiments, the liner optical absorption is less than the magnetic portion optical absorption. In some such embodiments the liner thermal conductivity is also greater than the pole thermal conductivity of the magnetic portion 144. However, in other embodiments, the liner thermal conductivity may not be greater than the pole thermal conductivity.

The thickness of the nonmagnetic liner 142 may also be configured. For example, in some embodiments, nonmagnetic liner 142 has a thickness not less than a skin depth corresponding to the energy. In some embodiments, the nonmagnetic liner 142 is at least five nanometers thick. In such embodiments, the magnetic portion 144 may absorb significantly less energy from the laser. In other embodiments, the thickness of the nonmagnetic liner 142 may vary. For example, the portion of the nonmagnetic liner 142 between the magnetic portion 144 and the NFT 138 is at least five nanometers thick, while another portion of the nonmagnetic liner 142 adjacent to the sides of the magnetic portion 144 is at least twenty-five nanometers and not more than fifty nanometers thick. In some embodiments, the total distance between the core 134 and the bottom of the magnetic portion 144 is desired to be kept constant. Consequently, the portion of the nonmagnetic liner 142 directly above the NFT 138 may have a constant thickness. However, away from the NFT 138, the portion of the nonmagnetic liner 142 along the bottom surface 147 of the magnetic portion 144 may be thicker. In addition, the write pole 140 may have a total width in the track width direction of not more than two hundred nanometers. In some embodiments, the width of the write pole 140 may be not more than one hundred fifty nanometers in the track width direction. In some embodiments, the write pole 140 may have a total width in the track width direction of not more the width of the NFT 138 in the track width direction.

The EAMR head 110 has improved thermal management. In some embodiments, the nonmagnetic liner 142 improves the thermal conductivity of the region of the NFT 138 and the write pole 140. Thus, heat may be channeled from the NFT 138 to the nonmagnetic liner 142 and be dissipated. Consequently, heat damage to the NFT 138 may be mitigated or prevented. In addition, heat from the write pole 140 may also be dissipated. In some embodiments, the optical absorption of the nonmagnetic liner 142 is less than that of the magnetic portion 144. The liner 142 may also have a thickness that is greater than the skin depth of the energy, or light, used. In such embodiments, the write pole 140 may have reduced absorption of the energy used in the EAMR head 110. Consequently, the write pole 140 may undergo less heating. As a result, there may be less thermal protrusion of the write pole 140. Consequently, the fly height of the EAMR head 110 may be made more stable. In some embodiments, the width of the write pole 140 is not more than the width of the disk 138A of the NFT 138. A narrow write pole 140 may also be desirable for improving the efficiency of the EAMR head 110. Thus, the EAMR head 110 may have improved efficiency. Because it is nonmagnetic, the nonmagnetic liner 142 may provide such benefits substantially without affecting the magnetic characteristics of the magnetic portion 144. Thus, performance and reliability of the EAMR head 110 may be improved.

Figure 4:
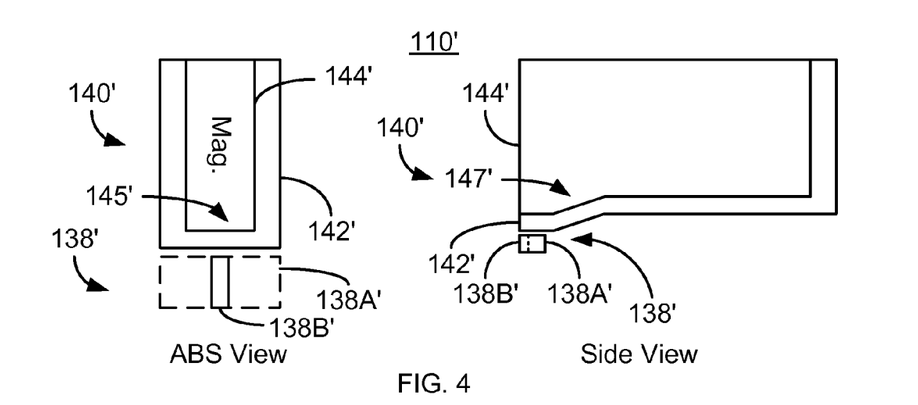
FIG. 4 depicts ABS and side views of an exemplary embodiment of a portion of an EAMR transducer.

FIGS. 4-8 depict ABS and side views of exemplary embodiments of a portion of an EAMR transducer. Note that one or more of the features depicted in FIGS. 4-8 may be combined in the EAMR head 110. FIG. 4 depicts an exemplary embodiment of an EAMR head 110'. For simplicity, only the write pole 140' and NFT 138' are shown. For clarity, FIG. 4 is not to scale. In addition, although the EAMR head 110' is depicted in the context of particular components other and/or different components may be used. Further, the arrangement of components may vary in different embodiments. The EAMR head 110' may be used in the EAMR disk drive 100. Consequently, similar components have analogous labels.

The write pole 140' includes nonmagnetic liner 142' and magnetic portion 144'. The NFT 138' includes a disk 138A' and a pin 138B'. The NFT 138' is shown as separated from the write pole 140' by a small space. However, in other embodiments, NFT 138' adjoins the write pole 140'. The width of the magnetic pole 140' in the track width direction does not exceed the width of the disk 138A' of the NFT 138'. In the embodiment shown, the thickness of the nonmagnetic liner 142' is larger along the sides of the magnetic portion 144' than between the magnetic portion 144' and the NFT 138'. However, in other embodiments, the thickness may vary in another manner. In addition, the nonmagnetic liner 142' is also thicker at the back of the main pole 140'. In another embodiment, the nonmagnetic liner 142' may be thinner or nonexistent distal from the ABS.

Figure 5:
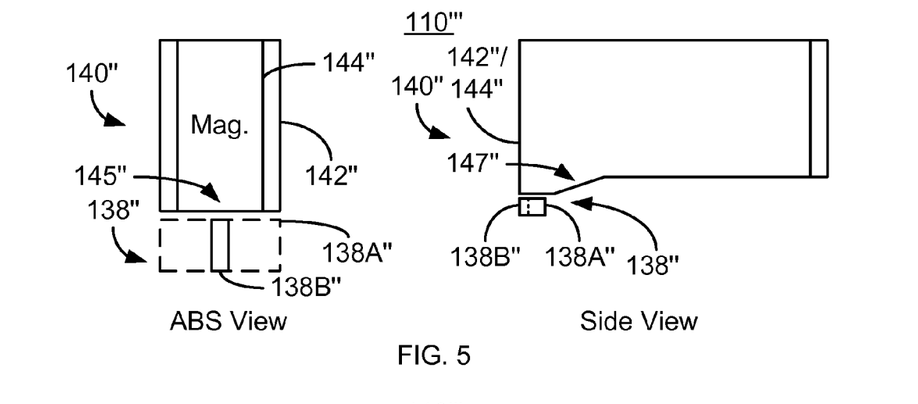
FIG. 5 depicts ABS and side views of another exemplary embodiment of a portion of an EAMR transducer.

FIG. 5 depicts ABS and side views of another exemplary embodiment of a portion of an EAMR transducer 110". For simplicity, only the write pole 140" and NFT 138" are shown. For clarity, FIG. 5 is not to scale. In addition, although the EAMR head 110" is depicted in the context of particular components other and/or different components may be used. Further, the arrangement of components may vary in different embodiments. The EAMR head 110" may be used in the EAMR disk drive 100. Consequently, similar components have analogous labels.

The write pole 140" includes nonmagnetic liner 142" and magnetic portion 144". The NFT 138" includes a disk 138A" and a pin 138B". The NFT 138" is shown as separated from the write pole 140" by a small space. However, in other embodiments, NFT 138" adjoins the write pole 140". The width of the magnetic pole 140" in the track width direction does not exceed the width of the disk 138A" of the NFT 138". In the embodiment shown, the nonmagnetic liner 142" resides only along the sides of the magnetic portion 144". In addition, the nonmagnetic liner 142" also resides at the back of the main pole 140". In another embodiment, the nonmagnetic liner 142" may be thinner or nonexistent distal from the ABS.

Figure 6:
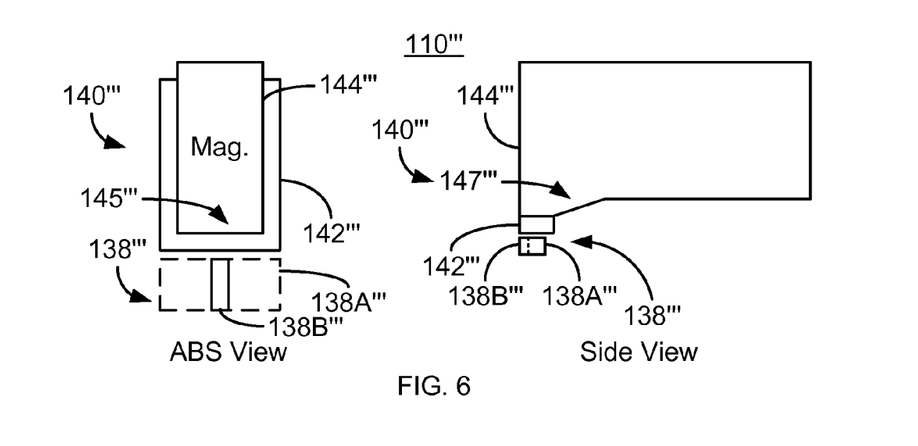
FIG. 6 depicts ABS and side views of another exemplary embodiment of a portion of an EAMR transducer.

FIG. 6 depicts ABS and side views of another exemplary embodiment of a portion of an EAMR transducer 110'''. For simplicity, only the write pole 140''' and NFT 138''' are shown. For clarity, FIG. 6 is not to scale. In addition, although the EAMR head 110''' is depicted in the context of particular components other and/or different components may be used. Further, the arrangement of components may vary in different embodiments. The EAMR head 110''' may be used in the EAMR disk drive 100. Consequently, similar components have analogous labels.

The write pole 140''' includes nonmagnetic liner 142''' and magnetic portion 144'''. The NFT 138''' includes a disk 138A''' and a pin 138B'''. The NFT 138''' is shown as separated from the write pole 140''' by a small space. However, in other embodiments, NFT 138''' adjoins the write pole 140'''. The width of the magnetic pole 140''' in the track width direction does not exceed the width of the disk 138A''' of the NFT 138'''. In the embodiment shown, the nonmagnetic liner 142''' does not extend completely along the sides of the magnetic portion 144'''. In particular, the nonmagnetic liner 144''' does not extend to the top of the magnetic portion 144'''. In addition, the nonmagnetic liner 142''' is shown as extending from the ABS along the NFT-facing surface 145''', but not beyond. Although the nonmagnetic liner 142''' extends farther from the ABS than the NFT 138''', in another embodiment, the nonmagnetic liner 142''' may not extend farther back from the ABS than the NFT 138'''.

Figure 7:
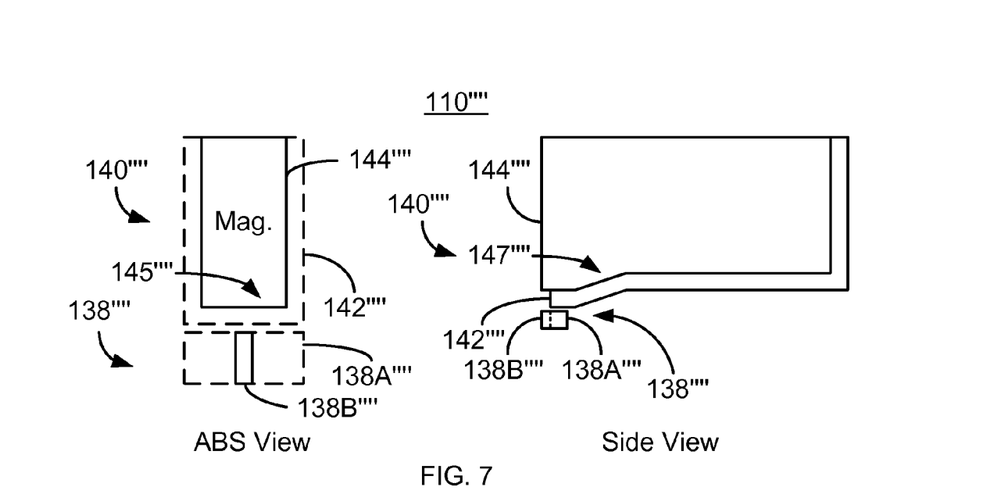
FIG. 7 depicts ABS and side views of another exemplary embodiment of a portion of an EAMR transducer.

FIG. 7 depicts ABS and side views of another exemplary embodiment of a portion of an EAMR transducer 110''''. For simplicity, only the write pole 140'''' and NFT 138'''' are shown. For clarity, FIG. 7 is not to scale. In addition, although the EAMR head 110'''' is depicted in the context of particular components other and/or different components may be used. Further, the arrangement of components may vary in different embodiments. The EAMR head 110'''' may be used in the EAMR disk drive 100. Consequently, similar components have analogous labels.

The write pole 140'''' includes nonmagnetic liner 142'''' and magnetic portion 144''''. The NFT 138'''' includes a disk 138A'''' and a pin 138B''''. The NFT 138'''' is shown as separated from the write pole 140'''' by a small space. However, in other embodiments, NFT 138'''' adjoins the write pole 140''''. The width of the magnetic pole 140'''' in the track width direction does not exceed the width of the disk 138A'''' of the NFT 138''''. In the embodiment shown, the nonmagnetic liner 142'''' does not extend completely along the sides of the magnetic portion 144''''. In particular, the nonmagnetic liner 144'''' does not extend to the ABS. The nonmagnetic liner 144'''' may be of particular utility if material(s) more likely to corrode, such as Cu, are used for the liner 142''''.

Figure 8:
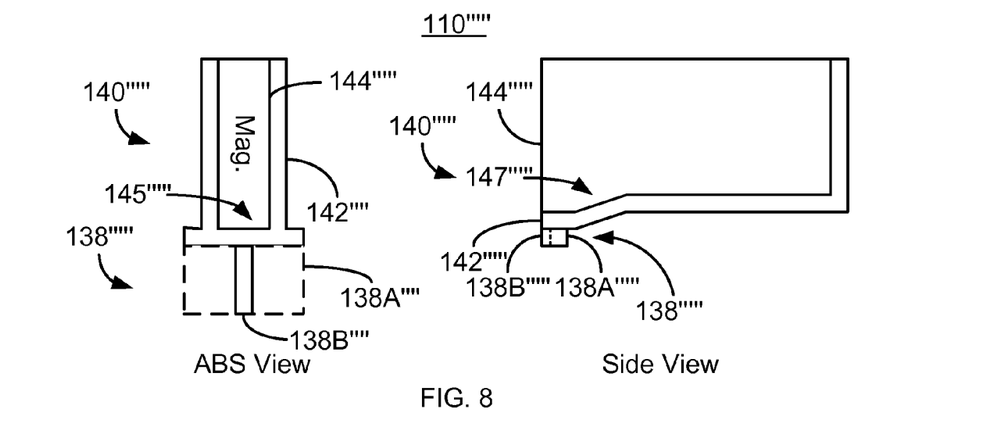
FIG. 8 depicts ABS and side views of another exemplary embodiment of a portion of an EAMR transducer.

FIG. 8 depicts ABS and side views of another exemplary embodiment of a portion of an EAMR head 110'''''. For simplicity, only the write pole 140''''' and NFT 138''''' are shown. For clarity, FIG. 8 is not to scale. In addition, although the EAMR head 110''''' is depicted in the context of particular components other and/or different components may be used. Further, the arrangement of components may vary in different embodiments. The EAMR head 110''''' may be used in the EAMR disk drive 100. Consequently, similar components have analogous labels.

The write pole 140''''' includes nonmagnetic liner 142''''' and magnetic portion 144'''''. The NFT 138''''' includes a disk 138A''''' and a pin 138B'''''. The NFT 138''''' is shown as adjoining the write pole 140'''''. However, in other embodiments, NFT 138''''' may be separated from the write pole 140''''' by a small space. The width of the magnetic pole 140''''', including the nonmagnetic liner 142''''', in the track width direction does not exceed the width of the disk 138A''''' of the NFT 138'''''. In the embodiment shown, the nonmagnetic liner 142''''' adjacent to the NFT-facing surface 145''''' extends farther in the track width direction than the portion of the nonmagnetic liner 142''''' adjacent to the sides of the magnetic portion 144'''''.

The EAMR heads 110', 110'', 110''', 110'''', and 110''''' use various configurations of the nonmagnetic liner 142', 142'', 142''', 142'''', and 142'''''. Thus, the EAMR heads 110', 110'', 110''', 110'''', and 110''''' share the benefits of the EAMR head 110. In particular, the EAMR heads 110', 110'', 110''', 110'''', and 110''''' have improved thermal management. More specifically, in at least some embodiments, the nonmagnetic liner 142', 142'', 142''', 142'''', and 142''''' improves the thermal conductivity of the region of the NFT 138', 138'', 138''', 138'''', and 138''''' and the write pole 140', 140'', 140''', 140'''', and 140'''''. Thus, heat may be channeled from the NFT 138', 138'', 138''', 138'''', and 138''''' to the nonmagnetic liner 142', 142'', 142''', 142'''', and 142''''' and be dissipated, for example in the slider 102. Consequently, heat damage to the NFT 138', 138'', 138''', 138'''', and 138''''' may be mitigated or prevented. In addition, heat from the write pole 140 may also be dissipated. In some embodiments, the optical absorption of the nonmagnetic liner 142', 142'', 142''', 142'''', 142''''' is less than that of the magnetic portion 144', 144'', 144''', 144'''', 144'''''. Further, the liner 142', 142'', 142''', 142'''', 142''''' may have a thickness that is greater than the skin depth of the energy, or light, used. In such embodiments, the write pole 140', 140'', 140''', 140'''', 140''''' may have reduced absorption of the energy used in the EAMR head 110', 110'', 110''', 110'''', 110'''''. In still other embodiments, the nonmagnetic liner 142', 142'', 142''', 142'''', 142''''' may have both a higher thermal conductivity and a lower optical absorption of energy used in the EAMR head. Thus, the benefits of the liner may be even greater. There may be less thermal protrusion of the write pole 140', 140'', 140''', 140'''', and 140'''''. Consequently, the fly height of the EAMR head 110', 110'', 110''', 110'''', 110''''' may be made more stable. In some embodiments, the width of the write pole 140', 140'', 140''', 140'''', 140''''' are not more than the width of the disk 138A', 138A'', 138A''', 138A'''', and 138A''''' of the NFT 138', 138'', 138''', 138'''', and 138'''''. A narrow write pole 140', 140'', 140''', 140'''', 140''''' may also be desirable for improving the efficiency of the EAMR head 110', 110'', 110''', 110'''', 110'''''. Thus, the EAMR head 110', 110'', 110''', 110'''', 110''''' may have improved efficiency. Because it is nonmagnetic, the nonmagnetic liner 142', 142'', 142''', 142'''', 142''''' may provide such benefits substantially without affecting the magnetic characteristics of the magnetic portion 144', 144'', 144''', 144'''', 144'''''. Thus, performance and reliability of the EAMR head 110', 110'', 110''', 110'''', 110''''' may be improved.

Figure 9:
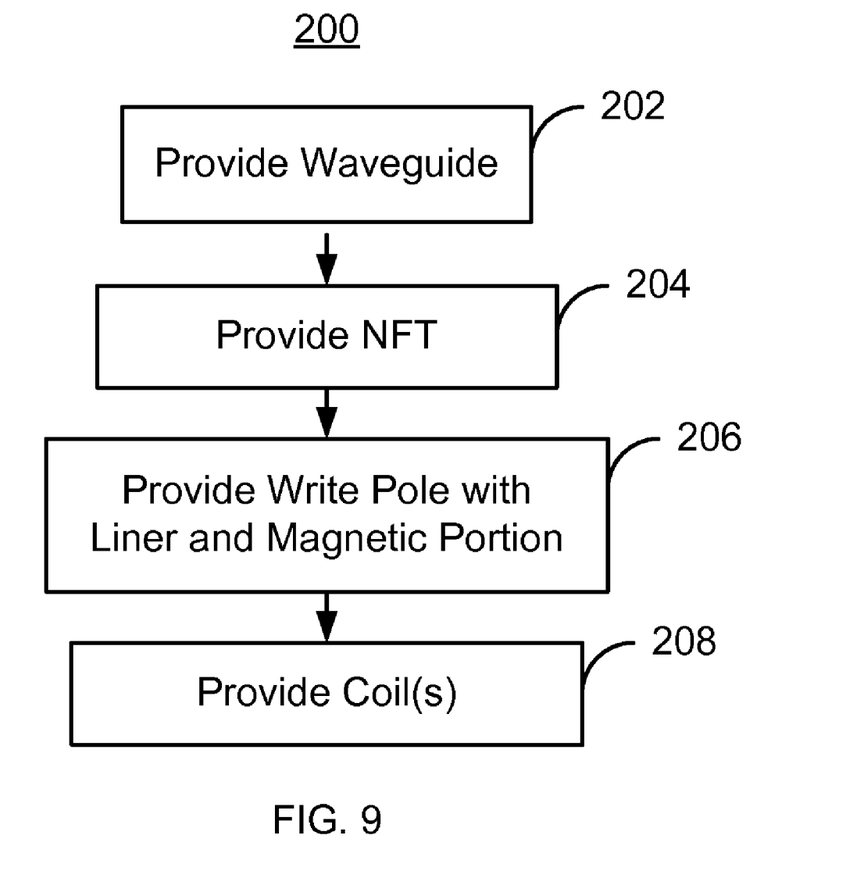
FIG. 9 depicts an exemplary embodiment of a method of forming a portion of an EAMR transducer.

FIG. 9 depicts an exemplary embodiment of a method 200 of forming a portion of an EAMR head. For simplicity, some steps may be omitted, combined, and/or performed in another sequence. The method 200 is described in the context of the EAMR disk drive 100 and EAMR head 110. However, the method 200 may be used to fabricate other EAMR heads, including but not limited to EAMR heads 110', 110'', 110''', 110'''', 110'''''. In addition, the method 200 is described in the context of fabricating a single disk drive 100. However, multiple transducers may be fabricated substantially in parallel. Further, although described as separate steps, portions of the method 200 may be interleaved.

The waveguide 130 is provided, via step 202. Step 202 includes fabricating the components 132, 134, and 136. In addition, the grating(s) (not shown) and other optical components may be fabricated. The NFT 138 may be provided, via step 204. Step 204 includes fabricating the disk 138A and pin 138B of the NFT 138.

The write pole 140 is provided, via step 206. Step 206 includes fabricating the nonmagnetic liner 142 and the magnetic portion 144. Thus, the desired materials may be deposited for the nonmagnetic liner 142 and magnetic portion 144. In addition, the nonmagnetic liner 142 and magnetic portion 144 may also be configured as desired. For example, the nonmagnetic liner 142', 142'', 142''', 142'''', 142''''', 142'''''' may be configured as shown in one or more of FIGS. 2-8. The coil(s) 146 may then be provided, via step 250.

Thus, using the method 200, the benefits of the EAMR disk drive 100, 100', 100'', 100''', 100'''', and/or 100''''' may be achieved.

We Claim:

1. An energy assisted magnetic recording (EAMR) transducer coupled with a laser for providing energy and having an air-bearing surface (ABS) configured to reside in proximity to a media during use, the EAMR transducer comprising:
   a waveguide configured to direct the energy from the laser toward the ABS;
   a near field transducer (NFT) proximate to the ABS, the NFT being optically coupled with the waveguide and for focusing the energy onto a region of the media;
   a write pole configured to write to the region of the media, the write pole having a magnetic portion and a nonmagnetic liner, the magnetic portion having a plurality of sides and a pole thermal conductivity, the nonmagnetic liner being adjacent to at least the plurality of sides and having a liner thermal conductivity greater than the pole thermal conductivity; and
   at least one coil for energizing the write pole.

2. The EAMR transducer of claim 1 wherein the NFT includes a disk and a pin, the pin residing between the disk and the ABS.

3. The EAMR transducer of claim 2 wherein the write pole extends not more than across the disk in a track width direction.

4. The EAMR transducer of claim 1 wherein the nonmagnetic liner includes at least one of gold, copper, silver, and a high thermal conductivity composite.

5. The EAMR transducer of claim 1 wherein the magnetic portion of the write pole includes an NFT-facing surface and wherein a portion of the nonmagnetic liner is adjacent to the NFT-facing surface.

6. The EAMR transducer of claim 5 wherein the magnetic portion of the write pole includes a bottom surface, the NFT-facing surface residing between he ABS and the bottom surface and wherein an additional portion of the nonmagnetic liner is adjacent to the bottom surface.

7. The EAMR transducer of claim 6 wherein the nonmagnetic liner adjoins the plurality of sides, the bottom surface, and the NFT-facing surface.

8. The EAMR transducer of claim 1 wherein nonmagnetic liner is recessed from the ABS.

9. The EAMR transducer of claim 1 wherein the nonmagnetic liner has a liner optical absorption of the energy from the laser and the magnetic portion of the write pole has a magnetic portion optical absorption of the energy from the laser, the liner optical absorption being less than the magnetic portion optical absorption.

10. The EAMR transducer of claim 9 wherein the nonmagnetic liner has a thickness not less than a skin depth of the energy.

11. The EAMR transducer of claim 1 wherein the nonmagnetic liner is at least five nanometers thick.

12. The EAMR transducer of claim 11 wherein the nonmagnetic liner includes a first portion and a second portion, the first portion of the nonmagnetic liner residing between the magnetic portion of the write pole and the NFT and being at least five nanometers thick, the second portion of the nonmagnetic liner being adjacent to the plurality of sides and being at least twenty-five nanometers and not more than fifty nanometers thick.

13. The EAMR transducer of claim 1 wherein the NFT extends a distance from the ABS into the EAMR transducer and wherein at least a portion of the nonmagnetic liner resides less than the distance from the ABS.

14. An energy assisted magnetic recording (EAMR) transducer coupled with a laser for providing energy and having an air-bearing surface (ABS) configured to reside in proximity to a media during use, the EAMR transducer comprising:
 a waveguide configured to direct the energy from the laser toward the ABS;
 a near field transducer (NFT) proximate to the ABS, the NFT being optically coupled with the waveguide and for focusing the energy onto a region of the media;
 a write pole configured to write to the region of the media, the write pole having a magnetic portion and a nonmagnetic liner, the magnetic portion having a plurality of sides and a magnetic portion optical absorption of the energy from the laser, the nonmagnetic liner being adjacent to at least the plurality of sides and having a liner optical absorption of the energy from the laser, the liner optical absorption being less than the magnetic portion optical absorption; and
 at least one coil for energizing the write pole.

15. An energy assisted magnetic recording (EAMR) transducer coupled with a laser for providing energy and having an air-bearing surface (ABS) configured to reside in proximity to a media during use, the EAMR transducer comprising:
 a waveguide configured to direct the energy from the laser toward the ABS;
 a near field transducer (NFT) proximate to the ABS and extending a distance from the ABS into the EAMR transducer, the NFT being optically coupled with the waveguide and for focusing the energy onto a region of the media, the NFT including a disk and a pin between the disk and the ABS;
 a write pole configured to write to the region of the media, the write pole having a magnetic portion, and a nonmagnetic liner, the write pole extending not more than across the disk in the track width direction, the magnetic portion having a plurality of sides, an NFT-facing surface, a bottom surface, a pole thermal conductivity, and a pole optical absorption of the energy from the laser, the NFT-facing surface residing between the ABS and the bottom surface, the nonmagnetic liner adjoining at least a portion of the plurality of sides, at least a portion of the bottom surface, and at least a portion of the NFT-facing surface, the nonmagnetic liner having a liner thermal conductivity greater than the pole thermal conductivity and a liner optical absorption less than the pole optical absorption, the nonmagnetic liner including at least one of Au, Cu, Ag, and a high thermal conductivity composite, a portion of the nonmagnetic liner extending to within the distance from the ABS; and
 at least one coil for energizing the pole.

16. An energy assisted magnetic recording (EAMR) disk drive comprising:
 a slider having an air-bearing surface (ABS) configured to reside in proximity to a media during use;
 a laser coupled with the slider for providing energy;
 an EAMR transducer coupled with the slider and including a waveguide configured to direct the energy from the laser toward the ABS, a near field transducer (NFT), a write pole, and at least one coil, the NFT residing proximate to the ABS, the NFT being optically coupled with the waveguide and for focusing the energy onto a region of the media, the write pole being configured to write to the region of the media and having a magnetic portion and a nonmagnetic liner, the magnetic portion having a plurality of sides and a pole thermal conductivity, the nonmagnetic liner being adjacent to at least the plurality of sides and having a liner thermal conductivity greater than the pole thermal conductivity, the at least one coil for energizing the write pole.

17. The EAMR disk drive of claim 16 wherein the NFT has a disk and a pin between the disk and the ABS, and wherein the write pole extends not further than across the disk in a track width direction.

18. The EAMR transducer of claim 17 wherein the magnetic portion of the write pole includes a bottom surface, and an NFT-facing surface residing between he ABS and the bottom surface and wherein an additional portion of the nonmagnetic liner is adjacent to the NFT-facing surface and the bottom surface.

19. An energy assisted magnetic recording (EAMR) disk drive comprising:
 a slider having an air-bearing surface (ABS) configured to reside in proximity to a media during use;
 a laser coupled with the slider for providing energy;
 an EAMR transducer coupled with the slider and including a waveguide configured to direct the energy from the laser toward the ABS, a near field transducer (NFT), a write pole, and at least one coil, the NFT residing proximate to the ABS, the NFT being optically coupled with the waveguide and for focusing the energy onto a region of the media, the write pole being configured to write to the region of the media and having a magnetic portion and a nonmagnetic liner, the magnetic portion having a plurality of sides and a magnetic portion optical absorption of the energy from the laser, the nonmagnetic liner being adjacent to at least the plurality of sides and having a liner optical absorption of the energy from the laser, the liner optical absorption being less than the magnetic portion optical absorption, the at least one coil for energizing the write pole.

20. A method for providing an energy assisted magnetic recording (EAMR) transducer coupled with a laser for providing energy and having an air-bearing surface (ABS) configured to reside in proximity to a media during use, the EAMR transducer comprising:
 providing a waveguide configured to direct the energy from the laser toward the ABS;
 providing a near field transducer (NFT) proximate to the ABS, the NFT being optically coupled with the waveguide and for focusing the energy onto a region of the media;
 providing a write pole configured to write to the region of the media, the write pole having a magnetic portion and a nonmagnetic liner, the magnetic portion having a plurality of sides and a pole thermal conductivity, the nonmagnetic liner being adjacent to at least the plurality of sides and having a liner thermal conductivity greater than the pole thermal conductivity; and providing at least one coil for energizing the write pole.

21. The method of claim 20 wherein the NFT has a disk and a pin between the disk and the ABS, and wherein the write pole extends not further than across the disk in a track width direction.

22. The method of claim 20 wherein the nonmagnetic liner includes at least one of gold, copper, silver, and zinc oxide.

23. The method of claim 20 wherein the magnetic portion of the write pole includes a bottom surface, and an NFT-facing surface residing between he ABS and the bottom surface and wherein an additional portion of the nonmagnetic liner is adjacent to the NFT-facing surface and the bottom surface.

24. A method for providing an energy assisted magnetic recording (EAMR) transducer coupled with a laser for providing energy and having an air-bearing surface (ABS) configured to reside in proximity to a media during use, the EAMR transducer comprising:

provessing a waveguide configured to direct the energy from the laser toward the ABS;

providing a near field transducer (NFT) proximate to the ABS, the NFT being optically coupled with the waveguide and for focusing the energy onto a region of the media;

providing a write pole configured to write to the region of the media, the write pole having a magnetic portion and a nonmagnetic liner, the magnetic portion having a plurality of sides and a magnetic portion optical absorption of the energy from the laser, the nonmagnetic liner being adjacent to at least the plurality of sides and having a liner optical absorption of the energy from the laser, the liner optical absorption being less than the magnetic portion optical absorption; and providing at least one coil for energizing the write pole.

* * * * *